US010068682B2

(12) United States Patent
Itani et al.

(10) Patent No.: US 10,068,682 B2
(45) Date of Patent: Sep. 4, 2018

(54) WIRING MODULE EQUIPPED WITH EXTERNAL COVER MEMBER

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Yasushi Itani, Mie (JP); Tomoya Kawaguchi, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/560,515

(22) PCT Filed: Mar. 16, 2016

(86) PCT No.: PCT/JP2016/058317
§ 371 (c)(1),
(2) Date: Sep. 22, 2017

(87) PCT Pub. No.: WO2016/163217
PCT Pub. Date: Oct. 13, 2016

(65) Prior Publication Data
US 2018/0114612 A1    Apr. 26, 2018

(30) Foreign Application Priority Data

Apr. 6, 2015    (JP) ................. 2015-077553

(51) Int. Cl.
*H02G 3/04*  (2006.01)
*H01B 7/18*  (2006.01)
(Continued)

(52) U.S. Cl.
CPC ............... *H01B 7/18* (2013.01); *B60R 16/03* (2013.01); *H01R 4/72* (2013.01); *H02G 3/04* (2013.01)

(58) Field of Classification Search
CPC ........ H01B 7/18; H01B 7/1805; H01B 7/181; H01B 7/28; B60R 16/03; B60R 16/00;
(Continued)

(56) References Cited

U.S. PATENT DOCUMENTS 8,237,053 B2 * 8/2012 Katou .................. B60R 16/027
174/68.1
8,561,296 B2 * 10/2013 Oga .................... B60R 16/0207
174/72 A (Continued)

FOREIGN PATENT DOCUMENTS

| JP | H5043716 U | 6/1993 |
| JP | H11178170 A | 7/1999 |

(Continued)

OTHER PUBLICATIONS

International Search Report for Application No. PCT/JP2016/058317 dated May 10, 2016; 5 pages.

*Primary Examiner* — Angel R Estrada
(74) *Attorney, Agent, or Firm* — Reising Ethington, P.C.

(57) ABSTRACT

A wiring module equipped with an external covering member includes an external covering pipe; a first conductive wire member that is inserted into the external covering pipe, a first end portion of the first conductive wire member extending from a first-end opening portion of the external covering pipe; a second conductive wire member that is (Continued)

connected to the first end portion of the first conductive wire member via a connection portion that is located outward of the first-end opening portion of the external covering pipe; and a bending mitigating member that is capable of undergoing elastic bending deformation more easily than the external covering pipe, a first end portion of the bending mitigating member being fixed to the first-end opening portion of the external covering pipe, and the bending mitigating member extending up to the connection portion or beyond the connection portion while surrounding the first conductive wire member.

5 Claims, 5 Drawing Sheets

(51) Int. Cl.
*H01R 4/72* (2006.01)
*B60R 16/03* (2006.01)
(58) Field of Classification Search
CPC ... B60R 16/0207; B60R 16/0307; H01R 4/72; H01R 4/723; H01R 9/00; H01R 9/03; H02G 3/04; H02G 3/0406; H02G 3/0412; H02G 3/00

USPC .......... 174/96, 68.1, 68.3, 94 R, 72 A, 70 C, 174/260; 248/68.1, 49, 74.1, 74.2
See application file for complete search history.

(56) References Cited

U.S. PATENT DOCUMENTS

| 8,981,221 | B2* | 3/2015 | Sawada | B60R 16/0215 |
|---|---|---|---|---|
| | | | | 174/102 R |
| 9,522,638 | B2* | 12/2016 | Oga | B60R 16/0215 |
| 9,809,180 | B2* | 11/2017 | Kuroishi | B60R 16/0215 |
| 9,919,662 | B2* | 3/2018 | Hayakawa | B60R 16/0215 |
| 9,923,348 | B2* | 3/2018 | Sugino | B60R 16/0215 |

FOREIGN PATENT DOCUMENTS

| JP | 2007073228 A | 3/2007 |
|---|---|---|
| JP | 2010073676 A | 4/2010 |

* cited by examiner

WIRING MODULE EQUIPPED WITH EXTERNAL COVER MEMBER

CROSS REFERENCE TO RELATED APPLICATIONS

This application claims the priority of Japanese patent application JP2015-077553 filed on Apr. 6, 2015, the entire contents of which are incorporated herein.

TECHNICAL FIELD

This invention relates to technology for protecting an electrical wire or the like.

BACKGROUND ART

Patent Document 1 (JP2007-73228A) discloses a shielded conductor that includes a first conductor such as a single-core wire and a metal shielding pipe into which the first conductor is inserted, and a second conductor, such as a stranded wire, that has different rigidity from the first conductor is conductibly connected to an end portion of the first conductor. In this Patent Document 1, the shielding pipe is provided with a stress mitigating means for mitigating change in bending stress in a range from the end portion of the first conductor to the second conductor. This stress mitigating means prevents breakage due to bending stress becoming concentrated in a portion of the connection portion between the first conductor and the second conductor.

A stress mitigating member that is made of rubber and has a columnar shape is disclosed as the stress mitigating means. An insertion hole is formed in the stress mitigating member, and the first conductor, a connection member, and the second conductor are inserted into this insertion hole.

Also, a spring that is wrapped around the outer circumferential surface in a range from the front end portion of the shielding pipe to a braided member is also disclosed as an example of the stress mitigating means.

SUMMARY

As disclosed in Patent Document 1, when the first conductor that is inserted into the pipe is to be connected to the second conductor, the connection portion is normally arranged outside of the pipe. In other words, the connection portion between the first conductor and the second conductor is wider than the other portions, and therefore it is difficult to perform the operation of inserting the connection portion into the pipe after connecting the first conductor and the second conductor. For this reason, the first conductor is first inserted into the pipe, and then the operation of connecting the first conductor and the second conductor is performed at a position outside of the pipe. Accordingly, the connection portion between the first conductor and the second conductor is arranged outside of the pipe.

In this case, the first conductor is located on the inner circumferential side of the opening portion of the pipe. For this reason, the weight of the second conductor and the weight of the connector connected to the end portion of the second conductor act on the end portion of the first conductor outside of the pipe, and the first conductor is forcefully pressed against the inner circumferential edge portion of the opening portion of the pipe. Accordingly, there is a risk that the first conductor, such as a single-core wire, will become deformed or the like.

In Patent Document 1, in the case where the disclosed stress mitigating means is a stress mitigating member that is made of rubber and has a columnar shape, it is difficult to perform the operation of inserting the first conductor, the connection member, and the second conductor into the insertion hole.

Also, in Patent Document 1, in the case where the stress mitigating means is a spring, the end portion of the wire-like member that constitutes the spring is exposed at the outer end portion. There is a risk that this end portion of the wire-like member of the spring will damage the braided member or the second conductor.

In view of this, an object of the present design is to, in the case of a member for suppressing the case where a single-core wire that extends from the end portion of an external covering pipe is forcefully pressed against the inner circumferential edge portion of the opening portion of the external covering pipe, enable the member to be easily attached in a manner of minimizing damage to a stranded wire or the like.

In order to solve the foregoing issue, a wiring module equipped with an external covering member according to a first aspect includes: an external covering pipe; a first conductive wire member that includes a single-core wire constituted by a single conductor body, and that is inserted into the external covering pipe, a first end portion of the first conductive wire member extending from a first-end opening portion of the external covering pipe; a second conductive wire member that includes a stranded wire constituted by twisting together a plurality of strands, and that is connected to the first end portion of the first conductive wire member via a connection portion located outward of the first-end opening portion of the external covering pipe; and a bending mitigating member capable of undergoing elastic bending deformation more easily than the external covering pipe, a first end portion of the bending mitigating member being fixed to the first-end opening portion of the external covering pipe, and the bending mitigating member extending up to the connection portion or beyond the connection portion while surrounding the first conductive wire member outward of the first-end opening portion of the external covering pipe, wherein the bending mitigating member includes a spiral wire-like body including portions that draw two spirals so as to surround the first conductive wire member, the portions being connected at a second end portion of the bending mitigating member.

A second aspect is the wiring module equipped with an external covering member according to the first aspect, wherein the first end portion of the bending mitigating member is fixed to the first-end opening portion of the external covering pipe in a state of being arranged inward of the first-end opening portion of the external covering pipe.

A third aspect is the wiring module equipped with an external covering member according to the second aspect, wherein a locking protrusion portion that protrudes outward is formed in the first end portion of the bending mitigating member, a locking recessed portion into which the locking protrusion portion can be fitted is formed in the external covering pipe, and in a state where the first end portion of the bending mitigating member is arranged inward of the first-end opening portion of the external covering pipe, the locking protrusion portion is fitted into the locking recessed portion, and the first end portion of the bending mitigating member is fixed to the first-end opening portion of the external covering pipe.

A fourth aspect is the wiring module equipped with an external covering member according to any one of the first to third aspects, wherein the spiral wire-like body is formed by a wire-like body being wrapped in a spiral manner around a bar-shaped member.

A fifth aspect is the wiring module equipped with an external covering member according to any one of the first to third aspects, wherein the spiral wire-like body is formed by a spiral-shaped slit being formed in a tube member.

According to the first aspect, the first end portion of the bending mitigating member is fixed to the first-end opening portion of the external covering pipe, and the bending mitigating member extends up to the connection portion or beyond the connection portion while surrounding the first conductive wire member outward of the first-end opening portion of the external covering pipe. For this reason, the first conductive wire member that includes the single-core wire is supported by the bending mitigating member so as to not bend a large amount outward of the first-end opening portion of the external covering pipe. Accordingly, it is possible to suppress the case where the single-core wire extending from the end portion of the external covering pipe is forcefully pressed against an inner circumferential edge portion of the opening portion of the external covering pipe. Also, the bending mitigating member is constituted to include the spiral wire-like body including portions that draw two spirals so as to surround the first conductive wire member, the portions being connected at the second end portion of the bending mitigating member, and therefore the first conductive wire member and the like can be easily arranged inside the bending mitigating member, and the bending mitigating member can be easily attached. Also, the portions that draw two spirals are connected at the second end portion of the bending mitigating member, thus making it possible to minimize damage to the second conductive wire member that includes the stranded wire.

According to the second aspect, direct contact between the first conductive wire member and the inner circumferential edge portion of the first-end opening portion of the external covering pipe is suppressed.

According to the third aspect, the locking protrusion portion that protrudes outward is formed on the first end portion of the bending mitigating member, and the locking recessed portion, into which the locking protrusion portion can be fitted, is formed in the external covering pipe. Also, in the state where the first end portion of the bending mitigating member is arranged inward of the first-end opening portion of the external covering pipe, the locking protrusion portion is fitted into the locking recessed portion, and the first end portion of the bending mitigating member is fixed to the first-end opening portion of the external covering pipe. The bending mitigating member that includes the spiral wire-like body can easily deform so as to decrease in diameter, and therefore the first end portion thereof can be easily arranged inside the first end portion of the external covering pipe, and the locking protrusion portion can be fitted into the locking recessed portion. Accordingly, the first end portion of the bending mitigating member can be easily fixed to the first end portion of the external covering pipe at a later time.

According to the fourth aspect, the spiral wire-like body can be produced easily.

According to the fifth aspect, the spiral wire-like body can be easily produced from the tube member.

DESCRIPTION OF EMBODIMENTS

Figure 1:
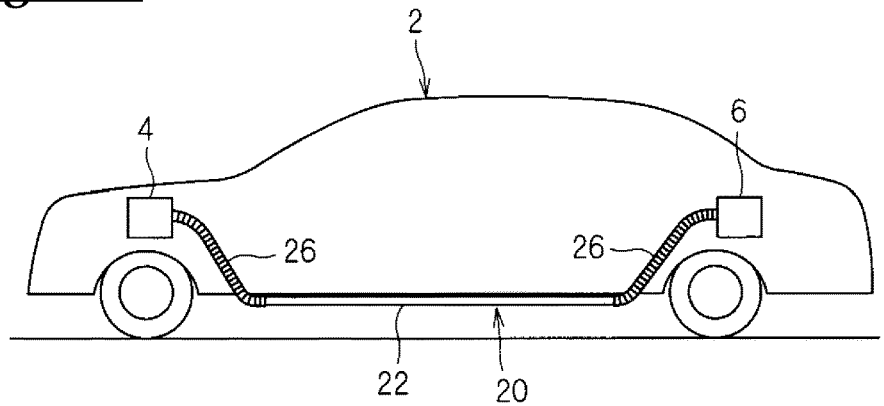
FIG. 1 is a schematic illustrative view of a state where a wiring module equipped with an external covering member according to an embodiment is attached to a vehicle.
Figure 2:
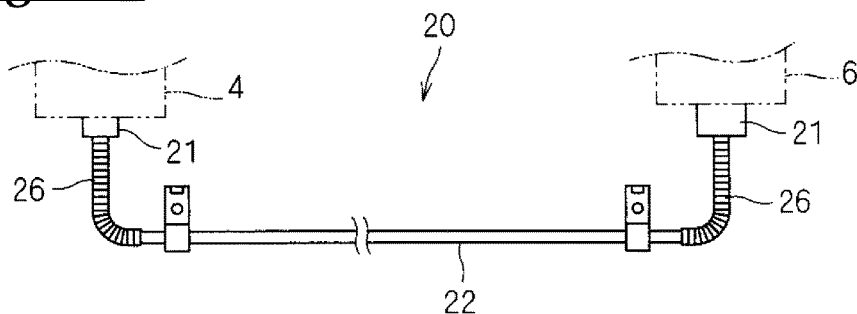
FIG. 2 is a schematic view of an overall configuration of the wiring module equipped with an external covering member.

The following describes a wiring module equipped with an external covering member according to an embodiment. FIG. 1 is a schematic illustrative view of a state where a wiring module equipped with an external covering member 20 is attached to a vehicle, and FIG. 2 is a schematic view of an overall configuration of the wiring module equipped with an external covering member 20.

This wiring module equipped with an external covering member 20 is used as, for example, a wiring member that connects a first electrical device 4 and a second electrical device 6 that are installed in a vehicle 2 such as an automobile.

The first electrical device 4 is arranged forward of the compartment of the vehicle 2 (e.g., in the engine room or the like), and the second electrical device 6 is arranged rearward of the compartment of the vehicle 2 (e.g., the lower side of the trunk or the like). For example, either the first electrical device 4 or the second electrical device 6 is a battery, and the other one is an inverter apparatus.

The wiring module equipped with an external covering member 20 is arranged so as to pass under the floor of the vehicle 2. It is preferable that an intermediate portion of the wiring module equipped with an external covering member 20 that is fixed to the underside of the floor is maintained in a certain shape (e.g., a straight shape) along the lower surface of the floor. On the other hand, connectors 21 are respectively connected to terminal portions of the wiring module equipped with an external covering member 20, and the connectors 21 are respectively connected to the first electrical device 4 and the second electrical device 6. Envisioning that an intermediate portion of the wiring module equipped with an external covering member 20 is fixed to the vehicle 2, and that the connectors 21 at the terminal portions of the wiring module equipped with an external covering member 20 are connected and fixed to the first electrical device 4 and the second electrical device 6, it is preferable that the end portions of the wiring module equipped with an external covering member 20 have an easily bendable configuration in order to absorb vibrational difference between the fixed locations. Also, it is preferable that the end portions of the wiring module equipped with an external covering member 20 have an easily bendable configuration in order to be rotated toward the first electrical device 4 and the second electrical device 6.

For this reason, first conductive wire members that include a single-core wire are used in the intermediate portion of the wiring module equipped with an external covering member 20. Also, in the intermediate portion of the wiring module equipped with an external covering member 20, an external covering pipe 22 is provided around the first conductive wire members. Accordingly, in this configuration, the intermediate portion of the wiring module equipped with an external covering member 20 is maintained in a predetermined path shape while also being protected.

On the other hand, second conductive wire members that include a stranded wire are used in the two end portions of the wiring module equipped with an external covering member 20. Also, easily bendable external covering members 26 such as corrugated tubes are provided around the two end portions of the wiring module equipped with an external covering member 20. Accordingly, the end portions of the wiring module equipped with an external covering member 20 have an easily bendable configuration while also being protected.

Figure 3:
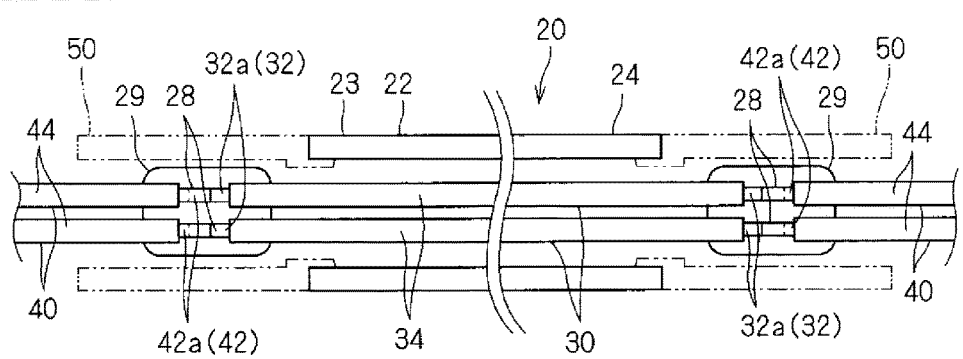
FIG. 3 is a partial schematic view of the wiring module equipped with an external covering member.
Figure 4:
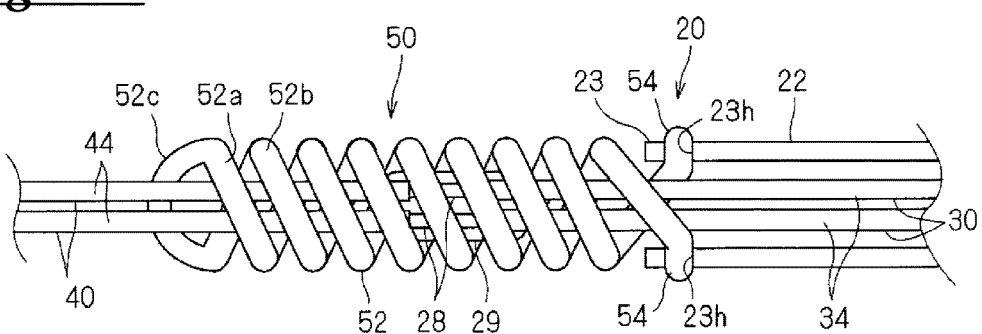
FIG. 4 is a schematic view of mainly a portion of the wiring module equipped with an external covering member that includes a bending mitigating member.
Figure 5:
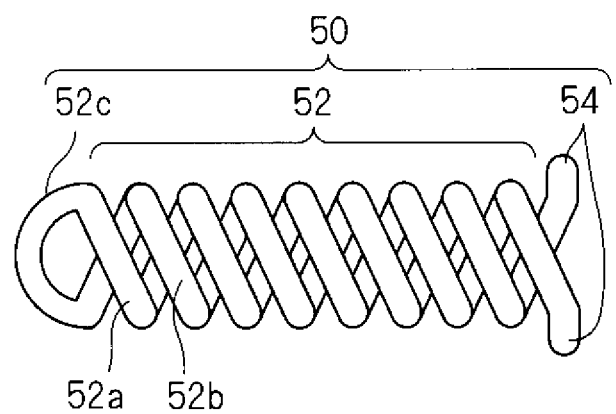
FIG. 5 is a schematic view of the bending mitigating member.

FIG. 3 is a partial schematic view of the wiring module equipped with an external covering member 20, FIG. 4 is a schematic view of mainly a portion of the wiring module equipped with an external covering member 20 that includes a bending mitigating member 50, and FIG. 5 is a schematic view of the bending mitigating member 50.

The wiring module equipped with an external covering member 20 includes the external covering pipe 22, first conductive wire members 30, second conductive wire members 40, and bending mitigating members 50.

The external covering pipe 22 is a member formed from a metal, a resin, or the like, and has a rigidity sufficient to hold a certain shape (in this embodiment, a straight shape) on its own.

If the external covering pipe 22 is a metal pipe, the metal external covering pipe 22 can electromagnetically shield the first conductive wire members 30 therein from the outside. In this case, a coating or the like may be applied to the outer side of the external covering pipe 22.

Also, in the case where the external covering pipe 22 is made of a resin, the first conductive wire members 30 can be electromagnetically shielded from the outside by providing a tubular metal braided member or the like around the first conductive wire members 30 inside the external covering pipe 22, by providing a tubular metal braided member or a metal pipe on the outside of the external covering pipe 22, or the like. Such electromagnetic shielding is not essential in the first place.

Note that the easily bendable external covering members 26 such as corrugated tubes are attached to the second conductive wire members 40 of the wiring module equipped with an external covering member 20. Specifically, the external covering members 26 are tubular members that bend more easily than the external covering pipe 22. Metal corrugated tubes, resin corrugated tubes, or the like are envisioned as the external covering members 26. The corrugated tubes can be corrugated tubes that have a slit formed therein such that the second conductive wire members 40 can be placed inside the corrugated tubes through the slits.

If the external covering members 26 are metal corrugated tubes, it is possible to achieve a function of electromagnetic shielding between the second conductive wire members 40 therein and the outside.

Also, if the external covering members 26 are resin corrugated tubes, the second conductive wire members 40 or the like can be electromagnetically shielded from the outside by placing a tubular metal braided member or the like around the second conductive wire members 40 or the like inside the external covering members 26, or by placing a tubular metal braided member or the like around the external covering members 26. Such electromagnetic shielding is not essential in the first place.

The first conductive wire members 30 each include a single-core wire 32 constituted by a single conductor body. The single-core wire 32 is formed from a metal material such as aluminum, an aluminum alloy, copper, or a copper alloy. The single-core wire 32 is filled and has no spaces inside, and therefore can be made narrower than in the case of being constituted by a stranded wire having the same cross-section, and also has a characteristic of tending to maintain a predetermined shape (in this embodiment, a straight shape). Also, if the single-core wire 32 is formed from aluminum or an aluminum alloy, it is possible to reduce the weight of the first conductive wire member 30, and thus reduce the weight of the wiring module equipped with an external covering member 20. In this embodiment, a plurality of (two in this case) first conductive wire members 30 are arranged inside the external covering pipe 22.

The cross-sectional shape of the single-core wire 32 along a plane orthogonal to the extending direction of the single-core wire 32 (hereinafter, called the transverse cross-sectional shape) can take a rectangular shape, a circular shape, or the like.

Also, in this embodiment, a sheath 34 is formed around the single-core wire 32. The sheath 34 is formed by, for example, extrusion coating the single-core wire 32 with softened resin. It is not essential for the sheath 34 to be formed around the single-core wire 32. In this case, for example, it is sufficient that the external covering pipe 22 is formed from resin or the like, and that the only one single-core wire 32 is arranged inside the external covering pipe 22.

Figure 7:
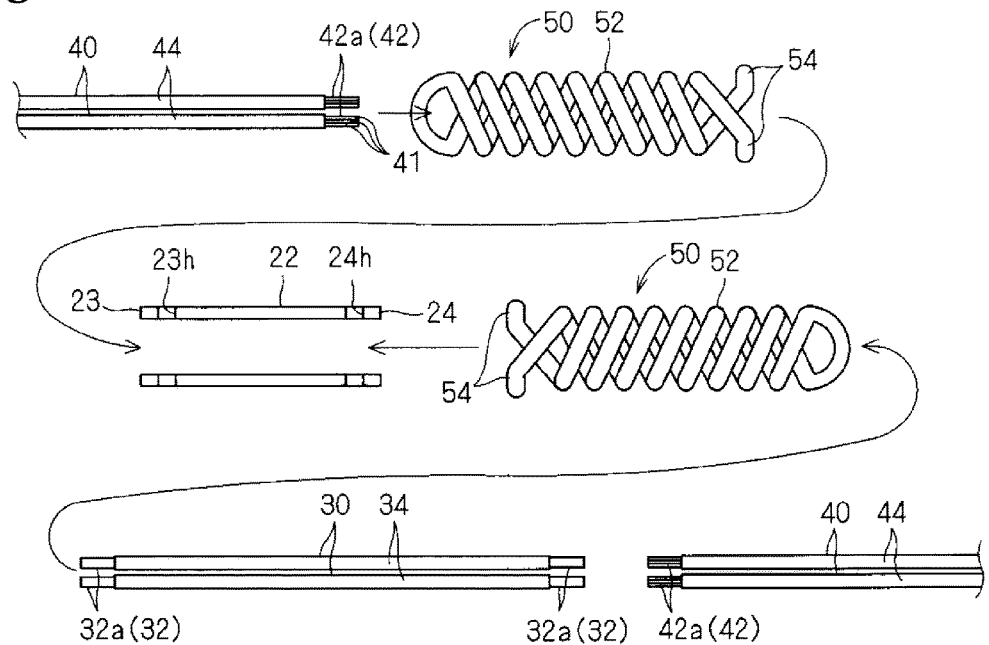
FIG. 7 is an illustrative diagram showing steps for manufacturing the wiring module equipped with an external covering member.

The second conductive wire members 40 each include a stranded wire 42 obtained by twisting together a plurality of strands 41 (see FIG. 7 etc.). The strands 41 that constitute the stranded wire 42 are formed from a metal material such as aluminum, an aluminum alloy, copper, or a copper alloy. The strands 41 can each bend individually, and therefore the stranded wire 42 has a characteristic of being easily bendable. Also, if the stranded wire 42 is formed from aluminum or an aluminum alloy, it is possible to reduce the weight of the second conductive wire member 40, and thus reduce the weight of the wiring module equipped with an external covering member 20. On the other hand, if the stranded wire 42 is formed from copper or a copper alloy, it can bend more easily.

In this embodiment, in accordance with the number of first conductive wire members 30, a plurality of (two in this embodiment) second conductive wire members 40 are used in a parallel state. Also, a plurality of (two in this embodiment) second conductive wire members 40 are used on each end side of the first conductive wire members 30.

Also, in this embodiment, a sheath 44 is formed around the stranded wire 42. The sheath 44 is formed by, for example, extrusion coating the stranded wire 42 with softened resin. It is not essential for the sheath 34 to be formed around the stranded wire 42. In this case, for example, it is sufficient that the external covering member 26 is formed from resin or the like, and that the only one stranded wire 42 is arranged inside the external covering member 26.

The single-core wire 32 included in the first conductive wire member 30 is not bent easily, and therefore is not suited to the case of being routed along a bent path, absorbing vibration difference between fixed locations, or the like. In view of this, in the wiring module equipped with an external covering member 20, the first conductive wire members 30 that include the single-core wires 32 are used in the portion that maintains a predetermined shape (in this embodiment, a straight shape), and the second conductive wire members 40 that include the stranded wires 42 are used in the portions that absorb vibration between fixed locations or are routed along a bent path.

Also, the first conductive wire members 30 are inserted into the external covering pipe 22, and first end portions thereof extend from a first-end opening portion 23 of the external covering pipe 22. Also, a second conductive wire member 40 is connected to the first end portion of each of the first conductive wire members 30 via a connection portion 28 that is outward of the first-end opening portion 23 of the external covering pipe 22.

More specifically, the sheath 34 is removed from the first end portion of each of the first conductive wire members 30, thus forming an exposed single-core wire 32a having a predetermined length in the end portion. Also, the sheath 44 is removed from the first end portion of the second conductive wire member 40, thus forming an exposed stranded wire 42a of a predetermined quantity in the end portion. Then, the exposed single-core wire 32a and the exposed stranded wire 42a are connected at a position outward of the first-end opening portion 23 of the external covering pipe 22. The exposed single-core wire 32a and the exposed stranded wire 42a are connected by, for example, ultrasonic welding, resistance welding, soldering, or crimping an intermediate connection terminal.

The connection portion 28 is formed at each connection between the first end portions of the first conductive wire members 30 and the first end portions of the second conductive wire members 40. In this embodiment, two connection portions 28 are formed. Also, a connection portion sheath portion 29 is formed so as to cover these connection portions 28. The connection portion sheath portion 29 is a member for covering and insulating the exposed single-core wires 32a and the exposed stranded wires 42a from the outside. The connection portion sheath portion 29 is formed by, for example, placing an unshrunk heat shrink tube around the connection portions 28 and the sheaths 34 and 44 in the vicinity thereof, and then heating the heat shrink tube so as to shrink. Note that it is preferable that the heat shrink tube is provided in a state in which an insulating member is placed between the two connection portions 28. Alternatively, separate heat shrink tubes may be provided around the two connection portions 28. Alternatively, the connection portion sheath portion 29 may be formed by applying a sealant, wrapping adhesive tape, or the like.

Note that in this embodiment, second end portions of the first conductive wire members 30 also extend from a second-end opening portion 24 of the external covering pipe 22. Also, first end portions of other second conductive wire members 40 are connected to the second end portions of the first conductive wire members 30 as well. In other words, similarly to the above description, two connection portions 28 and a connection portion sheath portion 29 that covers these two connection portions 28 are formed at on the other end side of the external covering pipe 22 as well.

The connection portions 28 and the connection portion sheath portions 29 are formed outside of the external covering pipe 22 for the following reasons.

Specifically, the connection portions 28 each tend to be wide because the exposed single-core wire 32a and the exposed stranded wire 42a are joined in a state of being overlaid in the extending direction. Moreover, the connection portion sheath portion 29 covers the connection portion 28, thus making the connection portion 28 even wider by the thickness of the connection portion sheath portion 29.

For this reason, it is difficult to perform the operation of inserting the first conductive wire member 30 and the second conductive wire member 40 into the external covering pipe 22 after being connected. Accordingly, it is preferable that the first conductive wire member 30 is inserted into the external covering pipe 22 before performing the operation of connecting the first conductive wire member 30 and the second conductive wire member 40.

Also, it is difficult to perform the operation of connecting the first conductive wire member 30 and the second conductive wire member 40 inside the external covering pipe 22. Moreover, it is difficult to return the wide connection portion 28 into the external covering pipe 22.

For this reason, the wiring module equipped with an external covering member 20 is manufactured while the connection portions 28 and the connection portion sheath portions 29 are arranged outside of the external covering pipe 22.

In this way, if the connection portions 28 are arranged outside of the external covering pipe 22, the first conductive wire members 30 are arranged inward of the inner circumferential edge portions of the first-end opening portion 23 and the second-end opening portion 24 of the external covering pipe 22.

Before the wiring module equipped with an external covering member 20 is attached to the vehicle 2, there are cases where the wiring module equipped with an external covering member 20 is transported, handled, or the like while holding the external covering pipe 22, and in such cases, the weight of the second conductive wire members 40, the weight of the connectors 21 at the ends thereof, and the like are applied to the end portions of the first conductive wire members 30. In such a case, the first conductive wire members 30 are forcefully pressed against the inner circumferential edge portions of the first-end opening portion 23 and the second-end opening portion 24 of the external covering pipe 22.

In this embodiment, the first conductive wire members 30 that include the single-core wires 32 have characteristics of tending to maintain a certain shape and not bending easily, and therefore the inner circumferential edge portions of the first-end opening portion 23 and the second-end opening portion 24 of the external covering pipe 22 are forcefully pressed against the first conductive wire members 30 in a concentrated and localized manner, and there is a risk of inviting deformation or the like of the sheaths 34 and the single-core wires 32.

In view of this, in the present embodiment, the bending mitigating members 50 are used in order to suppress the case where the first conductive wire members 30 are forcefully pressed against the inner circumferential edge portions of the first-end opening portion 23 and the second-end opening portion 24 of the external covering pipe 22.

The bending mitigating members 50 are formed with a shape capable of surrounding the first conductive wire members 30, and are configured to be capable of undergoing elastic bending deformation more easily than the external covering pipe 22. A first end portion of one bending mitigating member 50 is fixed to the first-end opening portion 23 of the external covering pipe 22, and extends outward from the first-end opening portion 23 of the external covering pipe 22. The length dimension of the bending mitigating member 50 is set large enough to extend from the first-end opening portion 23 of the external covering pipe 22 and reach the connection portion 28 or extend beyond the connection portion 28. Also, outward of the first-end opening portion 23 of the external covering pipe 22, the bending mitigating member 50 extends to the connection portion 28 or beyond the connection portion 28 while surrounding the first conductive wire member 30. Also, if the end portions of the first conductive wire members 30 attempt to bend a larger amount relative to the intermediate portions of the first conductive wire members 30 or the external covering pipe 22, the end portions of the first conductive wire members 30 abut against the inner circumferential portion of the bending mitigating member 50, thus receiving the bending force. Accordingly, the bending mitigating member 50 gradually elastically bends relative to the intermediate portions of the first conductive wire members or the external covering pipe 22, along with the end portions of the first conductive wire members 30. This suppresses the case where the inner circumferential edge portion of the first-end opening portion 23 of the external covering pipe 22 is forcefully pressed against the first conductive wire members 30. Also, if the force for bending the end portions of the first conductive wire members 30 is cancelled, the bending mitigating member 50 and the end portions of the first conductive wire members 30 return to their original straight state due to the elastic restoring force of the bending mitigating member 50.

Note that the connection portions 28 are covered by the connection portion sheath portion 29, and the second conductive wire members 40 bend easily, and therefore even if these members are pressed against the outer end portion opening of the bending mitigating member 50, the connection portions 28 and the stranded wires 42 are not likely to undergo deformation.

More specifically, the bending mitigating member 50 includes a spiral wire-like body 52 that draws a spiral while surrounding the first conductive wire members 30, and locking bodies 54 as locking protrusion portions.

The spiral wire-like body 52 is a resin or metal wire-like body that is formed so as to draw a spiral. Here, the spiral wire-like body 52 includes portions 52a and 52b that draw two spirals.

The locking bodies 54 that protrude outward are formed in a first end portion of the spiral wire-like body 52. In this embodiment, end portions of the portions 52a and 52b that form two spirals in the spiral wire-like body 52 are bent outward so as to form the locking bodies 54 that protrude in mutually opposite directions. Note that a configuration is possible in which only one locking body 54 is formed. Also, the locking bodies 54 may be omitted. In this case, the first end portion of the bending mitigating member is fixed by being pressed fitted into the external covering pipe, for example.

Also, in a second end portion of the spiral wire-like body 52, the portions 52a and 52b that draw two spirals are connected via a semicircular arc-shaped portion 52c. The semicircular arc-shaped portion 52c is arranged so as to be biased circumferentially outward and avoid an extension of the interior space of the spiral wire-like body 52.

Figure 6:
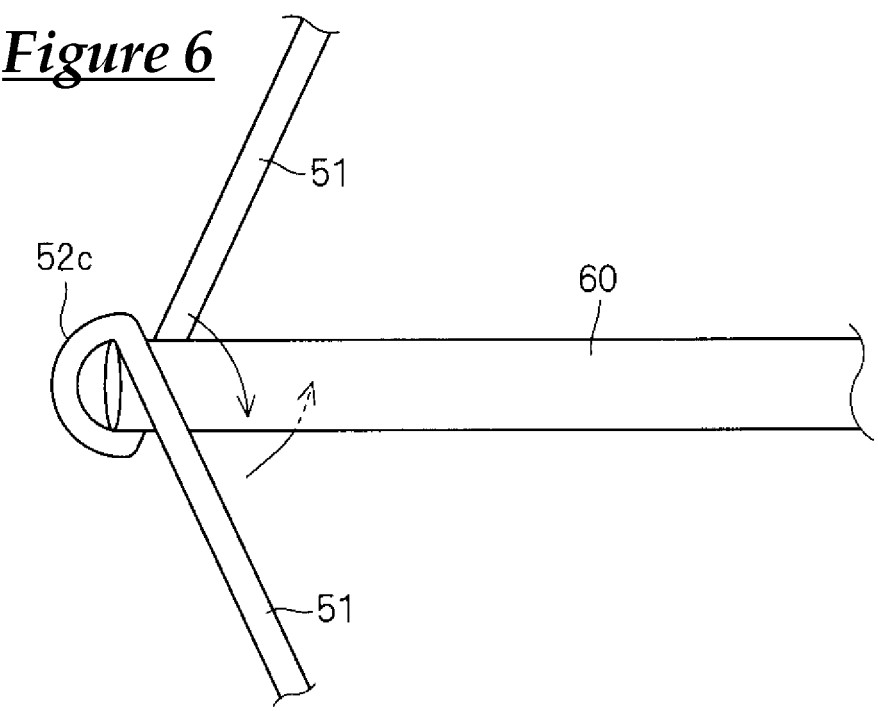
FIG. 6 is an illustrative diagram showing an example of steps for manufacturing the bending mitigating member.

This bending mitigating member 50 can be manufactured as shown in FIG. 6, for example.

Specifically, a bar-shaped member 60 is prepared, and an intermediate portion of a wire-like body 51 with respect to the extending direction thereof is bent in a U shape. A bent portion 52c of the wire-like body 51 is arranged at one end portion of the bar-shaped member 60, and the portions that extend on the two sides from the bent portion 52c are wrapped in a double spiral manner around the bar-shaped member 60, thus forming the spiral wire-like body 52. Lastly, the two end portions of the wire-like body 51 are bent outward in an L shape to form the locking bodies 54. Accordingly, the bending mitigating member 50 can be manufactured easily. Note that in the case where the wire-like body 51 is a metal member, it is sufficient to wrap the metal member around the bar-shaped member 60 while causing the metal member to undergo plastic deformation. Also, in the case where the wire-like body 51 is made of a resin, it is sufficient to wrap the wire-like body 51 around the bar-shaped member 60 while heating the wire-like body 51 to a deformable temperature, and then performing cooling.

Note that in order to be able to easily insert the connection portions 28 and the connection portion sheath portion 29 into the bending mitigating member 50, it is preferable that the inner diameter of the bending mitigating member 50 is larger than the inner diameter of the external covering pipe 22. The bending mitigating member 50, which has the above-described spiral structure, can deform such that the inner diameter increases in the first place, and therefore it is not essential for the inner diameter of the bending mitigating member 50 to be larger than the inner diameter of the external covering pipe 22. Also, the bending mitigating member 50 may be a member that originally has a spiral structure, and be obtained by die molding.

The wiring module equipped with an external covering member 20 can be manufactured as described below, for example. Note that in the drawings used in the following description, the external covering pipe 22, the first conductive wire members 30, and the like are illustrated shorter than in actuality.

First, as shown in FIG. 7, the external covering pipe 22 and the first conductive wire members 30 for insertion into the external covering pipe 22 are prepared. Also, the second conductive wire members 40 and the bending mitigating member 50 for arrangement on one end side of the external covering pipe 22 are prepared, and the second conductive wire members 40 and the bending mitigating member 50 for arrangement on the other end side of the external covering pipe 22 are prepared.

Figure 8:
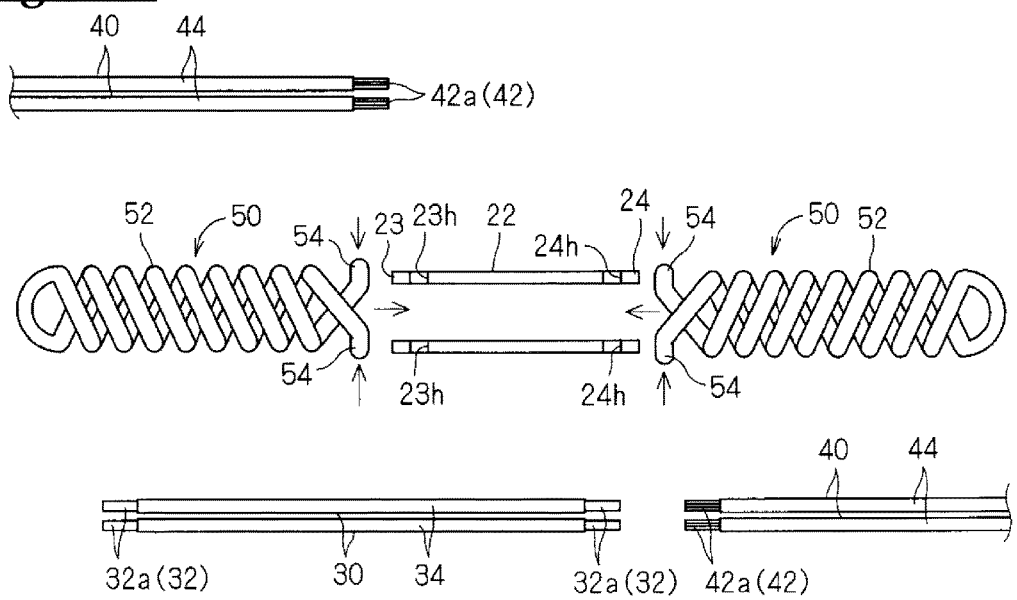
FIG. 8 is an illustrative diagram showing steps for manufacturing the wiring module equipped with an external covering member.

Then, as shown in FIG. 8, the bending mitigating members 50 are fixed to the first-end and second-end opening portions 23 and 24 of the external covering pipe 22. This fixing can be performed by arranging first end portions of the bending mitigating members 50 inside the opening portions 23 and 24 of the external covering pipe 22, and fitting the locking bodies 54 into locking holes 23h and 24h that serve as locking recessed portions formed in the opening portions 23 and 24 of the external covering pipe 22.

Specifically, a pair of opposing locking holes 23h are formed at positions inward of (slightly inward of) the end portion of the opening portion 23 of the external covering pipe 22, and a pair of opposing locking holes 24h are formed at positions inward of (slightly inward of) the end portion of the opening portion 24. Note that the locking holes 23h do not need to completely penetrate the external covering pipe from the inside to the outside. Locking recessed portions that are recessed in a view from inside the external covering pipe and do not penetrate to the outside may be formed.

The first end portion of one of the bending mitigating members 50 is fitted into the opening portion 23 of the external covering pipe 22 while pressing inward the locking bodies 54 in the first end portion of the bending mitigating member 50. Subsequently, when the force for pressing the pair of locking bodies 54 inward is released, the pair of locking bodies 54 are fitted inside the pair of locking holes 23h. Accordingly, the first end portion of the bending mitigating member 50 is fitted into the opening portion 23 of the external covering pipe 22, and the bending mitigating member 50 and the external covering pipe 22 are maintained in a positional relationship of extending in a straight line. Also, due to the pair of locking bodies 54 being fitted into the pair of locking holes 23h, the bending mitigating member 50 is held in a state of being positioned at a certain position in the extending direction of the external covering pipe 22 relative thereto.

Note that the bending mitigating members 50 can each be deformed so as to decrease in diameter due to being formed with the spiral wire-like body 52. For this reason, even if the outer diameter of the bending mitigating member 50 is larger than the inner diameter of the external covering pipe 22, the first end portion of the bending mitigating member 50 can be deformed to have a smaller diameter in order to be able to be fitted into the first-end opening portion 23 of the external covering pipe 22.

Similarly, the other bending mitigating member 50 is fixed to the other end portion of the external covering pipe 22 as well.

Figure 9:
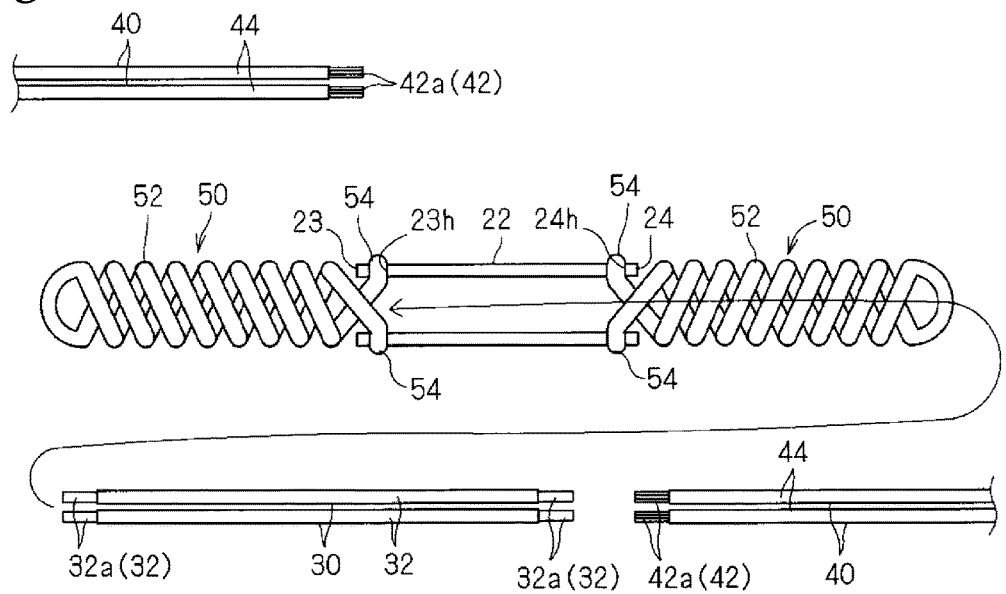
FIG. 9 is an illustrative diagram showing steps for manufacturing the wiring module equipped with an external covering member.
Figure 10:
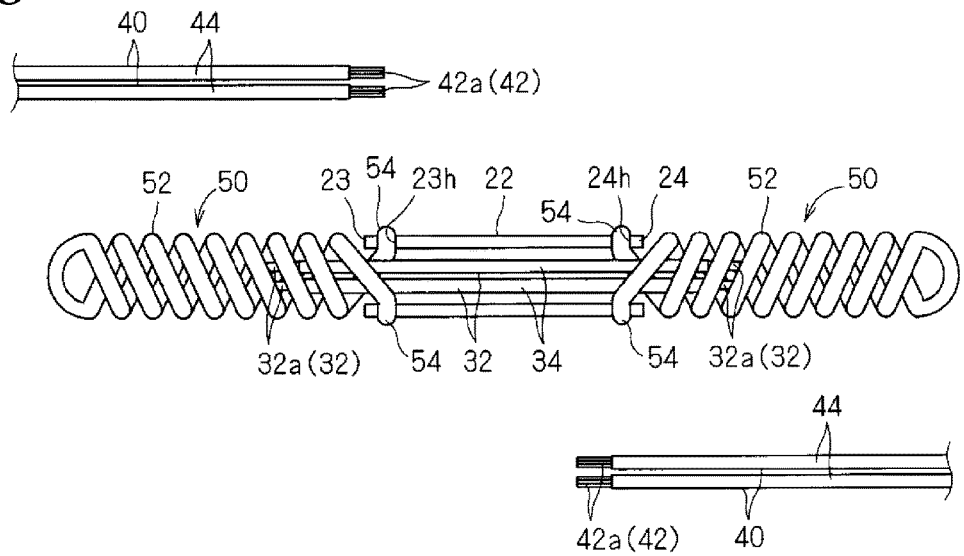
FIG. 10 is an illustrative diagram showing steps for manufacturing the wiring module equipped with an external covering member.

Subsequently, as shown in FIGS. 9 and 10, the first conductive wire members 30 are inserted into the external covering pipe 22 through the bending mitigating member 50 on either end side, and the two end portions of the first conductive wire members 30 are arranged at positions outward of the first-end and second-end opening portions 23 and 24 of the external covering pipe 22.

Figure 11:
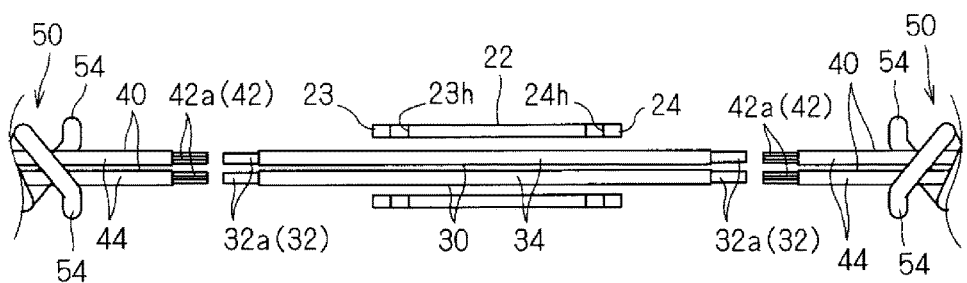
FIG. 11 is an illustrative diagram showing steps for manufacturing the wiring module equipped with an external covering member.

Subsequently, as shown in FIG. 11, the bending mitigating members 50 are detached from the first-end and second-end opening portions 23 and 24 of the external covering pipe 22. Specifically, the pair of locking bodies 54 are deformed inward by, for example, pressing a portion of the bending mitigating member 50 that is in a vicinity of the pair of locking holes 23h, and then the bending mitigating members 50 are pulled outward of the first-end and second-end opening portions 23 and 24 of the external covering pipe 22.

Note that the following describes the reason why the bending mitigating members 50 are fixed to the first-end and second-end opening portions 23 and 24 of the external covering pipe 22 when the first conductive wire members 30 are inserted into the external covering pipe 22. Specifically, when the first conductive wire members 30 are inserted into the external covering pipe 22, there is a risk that the first conductive wire members 30 will come into contact with the inner circumferential edge portions of the first-end and second-end opening portions 23 and 24 of the external covering pipe 22. In this case, there is a risk that the first conductive wire members 30 will become damaged or the like. In view of this, if the bending mitigating members 50 are fixed to the first-end and second-end opening portions 23 and 24 of the external covering pipe 22, the first end portions of the bending mitigating members 50 are arranged inside of the opening portions 23 and 24 of the external covering pipe 22. For this reason, when the first conductive wire members 30 are arranged inside the external covering pipe 22, the first conductive wire members 30 are not likely to directly come into contact with the inner circumferential edge portions of the opening portions 23 and 24 of the external covering pipe 22. Accordingly, damage to the first conductive wire members 30 is suppressed.

Note that in the above steps, instead of fixing the bending mitigating members 50 to the external covering pipe 22 in advance, holders that are made of a resin or the like and cover the inner circumferential edge portions of the first-end and second-end opening portions 23 and 24 of the external covering pipe 22 may be attached thereto. These holders may be removed after inserting the second conductive wire members 40 into the external covering pipe 22, or may be left attached.

Figure 12:
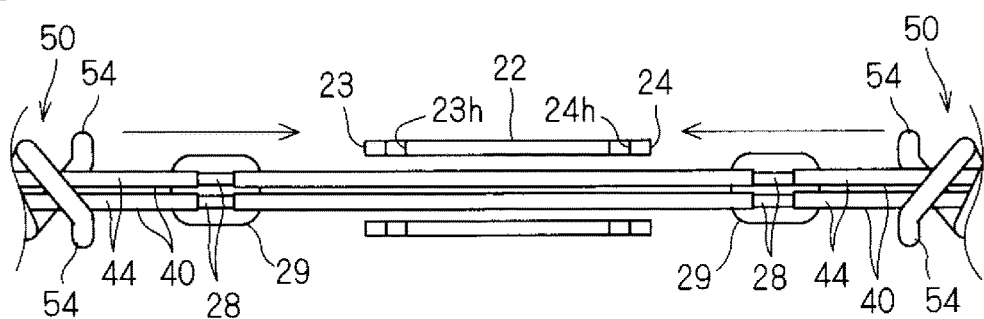
FIG. 12 is an illustrative diagram showing steps for manufacturing the wiring module equipped with an external covering member.

When the bending mitigating members 50 are removed from the external covering pipe 22, the two end portions of the first conductive wire members 30 are arranged outward of the ends of the external covering pipe 22. In this state, as shown in FIG. 12, the exposed stranded wires 42a in the end portions of the second conductive wire members 40 are connected to the exposed single-core wires 32a at the two ends of the first conductive wire members 30. Also, the connection portion sheath portions 29 are formed around these connection portions. Note that when these connections are made, the second conductive wire members 40 may be inserted into the bending mitigating members 50, or the second conductive wire members 40 may be inserted into the bending mitigating members 50 from the opposite side after the connections are made.

Next, the bending mitigating members 50 are once again fixed to the first-end and second-end opening portions 23 and 24 of the external covering pipe 22.

Subsequently, the external covering members 26 are placed around the second conductive wire members 40 and the bending mitigating members 50, and the connectors 21 or the like are connected to the end portions on the opposite sides of the second conductive wire members 40, thus completing the wiring module equipped with an external covering member 20. Note that the connectors 21 or the like may be connected to the end portions on the opposite sides of the second conductive wire member 40 in advance.

According to the wiring module equipped with an external covering member 20 configured in this way, the first end portion of one bending mitigating member 50 is fixed to the first-end opening portion 23 of the external covering pipe 22, and this bending mitigating member 50 extends up to the connection portion 28 or beyond the connection portion 28 while surrounding the first conductive wire members 30 outward of the first-end opening portion 23 of the external covering pipe 22. For this reason, the first conductive wire members 30 that each include the single-core wire 32 are elastically supported by the bending mitigating member 50 so as to not bend a large amount outward of the first-end opening portion 23 of the external covering pipe 22. Accordingly, it is possible to suppress the case where the single-core wires 32 extending from the end portion of the external covering pipe 22 are forcefully pressed against the inner circumferential edge portion of the opening portion 23 of the external covering pipe 22.

In the present embodiment, at the second-end opening portion 24 of the external covering pipe 22 as well, it is possible to suppress the case where the single-core wires 32 extending from the end portion of the external covering pipe 22 are forcefully pressed against the inner circumferential edge portion of the opening portion 24 of the external covering pipe 22.

Accordingly, it is possible to effectively suppress deformation of the single-core wires 32 of the first conductive wire members 30, damage to the sheaths 34 of the first conductive wire members 30, and the like.

Also, the bending mitigating members 50 each include the spiral wire-like body 52 that draws a spiral so as to surround the first conductive wire members 30, and therefore the first conductive wire members 30 can be easily arranged therein, the spiral wire-like body 52 can be easily elastically bent from the straight state and also easily return to the original straight state through elastic restoring force. For this reason, due to the spiral wire-like body 52, the first conductive wire members 30 that include the single-core wire 32 can be appropriately elastically supported by the bending mitigating member 50 so as to not bend a large amount outward of the first-end opening portion 23 of the external covering pipe 22.

Also, the bending mitigating members 50 are each configured to include the spiral wire-like body 53 that includes the portions 53a and 53b that draw two spirals so as to surround the first conductive wire members 30 and that are connected at the second end portion of the bending mitigating member, and therefore end portions of the spiral wire-like body 53 are not provided at the second end portion of the bending mitigating member 50, that is to say, are not provided around the second conductive wire members 40. Here, the semicircular arc-shaped portion 52c that connects the portions 53a and 53b is provided around the second conductive wire members 40. For this reason, it is possible to minimize damage to the second conductive wire members 40 that include stranded wires by the bending mitigating member 50.

Also, the first end portion of the bending mitigating member 50 is fixed to the first-end opening portion 23 of the external covering pipe 22 in the state of being arranged inward of the first-end opening portion 23 of the external covering pipe 22, thus suppressing direct contact between the first conductive wire members 30 and the inner circumferential edge portion of the first-end opening portion 23 of the external covering pipe 22. Accordingly, damage or the like to the sheaths 34 is effectively suppressed when the first conductive wire members 30 are inserted into the external covering pipe 22 or after insertion.

Also, the locking bodies 54 that protrude outward are formed in the first end portion of the bending mitigating member 50, and the locking holes 23h, into which the locking bodies 54 can be fitted, are formed in the external covering pipe 22. Furthermore, when the first end portion of the bending mitigating member 50 is arranged inward of the first-end opening portion of the external covering pipe 22, the locking bodies 54 are fitted into the locking holes 23h, and the first end portion of the bending mitigating member 50 is fixed to the first-end opening portion of the external covering pipe 22. Here, the bending mitigating member 50 that includes the spiral wire-like body 53 can easily deform so as to decrease in diameter, and therefore the first end portion thereof can be easily arranged inside the first end portion of the external covering pipe 22, and the locking bodies 54 can be fitted into the locking holes 23h. Accordingly, the first end portion of the bending mitigating member 50 can be easily fixed to the first end portion of the external covering pipe 22 at a later time.

Figure 13:
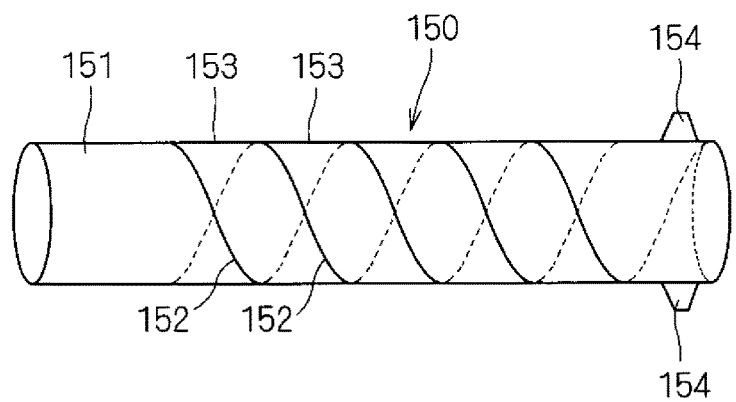
FIG. 13 is a diagram showing a bending mitigating member according to a variation.

FIG. 13 is an illustrative diagram showing a bending mitigating member 150 according to a variation. This bending mitigating member 150 is formed by forming spiral-shaped slits 152 in a tube member 151 formed from a resin or the like. In this case, two slits 152 are formed in a double spiral manner.

Also, a pair of locking bodies 154 that protrude in the outward direction are formed on an outer circumferential portion of one end portion of the bending mitigating member 150. The locking bodies 154 may be portions that are formed integrally when forming the tube member 151, or may be joined at a later time using an adhesive or the like. The bending mitigating member 150 can be fixed to the external covering pipe 22 by fitting the locking bodies 154 into the locking holes 23h of the external covering pipe 22 similarly to the above embodiment.

Also, the two slits 152 reach the edge of the one end portion of the tube member 151, but do not reach the edge of the other end portion. This is because if the two slits 152 reach the edges of both end portions of the tube member 151, the tube member 151 will be divided into two. For this reason, the portions of the two slits 152 that draw two spirals are formed so as to be connected via a tubular portion of the other end portion of the tube member 151 (the other end portion of the bending mitigating member 150). Accordingly, similarly to the above embodiment, the portions that draw spirals do not protrude from the other end portion of the bending mitigating member 150, and it is not likely for such portions to damage the second conductive wire members 40.

This variation has an advantage in that it is easy to manufacture the spiral wire-like body 153, which is divided by the slits 152, from the tube member 151.

Note that the configurations described as the above embodiment and variations can be appropriately combined as long as no contradiction arises.

Although this invention has been described in detail above, the above description is illustrative in all respects, and this invention is not limited to the above description. It will be understood that numerous variations not illustrated here can be envisioned without departing from the range of this invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

20 Wiring module equipped with an external covering member

22 External covering pipe
23h Locking hole
24h Locking hole
28 Connection portion
29 Connection portion sheath portion
30 First conductive wire member
32 Single-core wire
40 Second conductive wire member
42 Stranded wire
50, 150, 250 Bending mitigating member
51 Wire-like body
52 Spiral wire-like body
54 Locking body
60 Bar-shaped member
151, 251 Tube member
152 Slit
153 Spiral wire-like body
154 Locking body

The invention claimed is:

1. A wiring module equipped with an external covering member, comprising:
   an external covering pipe;
   a first conductive wire member that includes a single-core wire constituted by a single conductor body, and that is inserted into the external covering pipe, a first end portion of the first conductive wire member extending from a first-end opening portion of the external covering pipe;
   a second conductive wire member that includes a stranded wire constituted by twisting together a plurality of strands, and that is connected to the first end portion of the first conductive wire member via a connection portion located outward of the first-end opening portion of the external covering pipe; and
   a bending mitigating member capable of undergoing elastic bending deformation more easily than the external covering pipe, a first end portion of the bending mitigating member being fixed to the first-end opening portion of the external covering pipe, and the bending mitigating member extending up to the connection portion or beyond the connection portion while surrounding the first conductive wire member outward of the first-end opening portion of the external covering pipe,
   wherein the bending mitigating member includes a spiral wire-like body including portions that draw two spirals so as to surround the first conductive wire member, the portions being connected at a second end portion of the bending mitigating member.

2. The wiring module equipped with an external covering member according to claim 1, wherein the first end portion of the bending mitigating member is fixed to the first-end opening portion of the external covering pipe in a state of being arranged inward of the first-end opening portion of the external covering pipe.

3. The wiring module equipped with an external covering member according to claim 2,
   wherein a locking protrusion portion that protrudes outward is formed in the first end portion of the bending mitigating member,
   a locking recessed portion into which the locking protrusion portion can be fitted is formed in the external covering pipe, and
   in a state where the first end portion of the bending mitigating member is arranged inward of the first-end opening portion of the external covering pipe, the locking protrusion portion is fitted into the locking recessed portion, and the first end portion of the bending mitigating member is fixed to the first-end opening portion of the external covering pipe.

4. The wiring module equipped with an external covering member according to claim 1, wherein the spiral wire-like body is formed by a wire-like body being wrapped in a spiral manner around a bar-shaped member.

5. The wiring module equipped with an external covering member according to claim 1, wherein the spiral wire-like body is formed by a spiral-shaped slit being formed in a tube member.

* * * * *